(12) United States Patent
Hashimoto

(10) Patent No.: US 9,109,510 B2
(45) Date of Patent: Aug. 18, 2015

(54) GAS TURBINE ENGINE BEARING SUPPORT STRUT

(75) Inventor: Shinya Hashimoto, Tokyo (JP)

(73) Assignee: MITSUBISHI HITACHI POWER SYSTEMS, LTD., Yokohamai-shi (JP)

( * ) Notice: Subject to any disclaimer, the term of this patent is extended or adjusted under 35 U.S.C. 154(b) by 484 days.

(21) Appl. No.: 13/599,651

(22) Filed: Aug. 30, 2012

(65) Prior Publication Data

US 2013/0224011 A1    Aug. 29, 2013

(30) Foreign Application Priority Data

Feb. 27, 2012    (JP) ................................ 2012-039942

(51) Int. Cl.
| | |
|---|---|
| *F02C 7/12* | (2006.01) |
| *F02C 7/28* | (2006.01) |
| *F01D 9/06* | (2006.01) |
| *F01D 25/16* | (2006.01) |

(52) U.S. Cl.
CPC . *F02C 7/12* (2013.01); *F01D 9/065* (2013.01); *F01D 25/162* (2013.01); *F02C 7/28* (2013.01); *F05D 2250/15* (2013.01)

(58) Field of Classification Search
CPC ............ F02C 7/12; F02C 7/28; F01D 25/162; F01D 25/164; F01D 25/12; F01D 25/125; F01D 9/065; F05D 2240/14
See application file for complete search history.

(56) References Cited

U.S. PATENT DOCUMENTS

| | | | | |
|---|---|---|---|---|
| 2,941,781 | A | * | 6/1960 | Boyum .......................... 415/142 |
| 4,304,522 | A | * | 12/1981 | Newland ....................... 415/135 |
| 5,080,555 | A | | 1/1992 | Kempinger |
| 2010/0135770 | A1 | | 6/2010 | Durocher et al. |
| 2010/0135786 | A1 | | 6/2010 | Manteiga et al. |
| 2010/0275572 | A1 | * | 11/2010 | Durocher et al. ............ 60/39.08 |
| 2011/0081237 | A1 | | 4/2011 | Durocher et al. |

(Continued)

FOREIGN PATENT DOCUMENTS

| | | |
|---|---|---|
| EP | 2 192 276 A2 | 6/2010 |
| EP | 2 261 468 A1 | 12/2010 |
| JP | 2004-52598 A | 2/2004 |

(Continued)

OTHER PUBLICATIONS

Written Opinion of PCT/JP2012/071982, mailing date of Oct. 23, 2012, w/English translation (6 pages).

(Continued)

*Primary Examiner* — Nathaniel Wiehe
*Assistant Examiner* — Eldon Brockman
(74) *Attorney, Agent, or Firm* — Westerman, Hattori, Daniels & Adrian, LLP

(57) ABSTRACT

A gas turbine according to the present invention includes: a strut which passes through an outer diffuser and an inner diffuser, and connects an exhaust chamber wall and a bearing housing; a strut cover which covers the strut along the extending direction of the strut; a partitioning wall which is arranged between the inside of the inner diffuser in the radial direction and the outside of the bearing housing in the radial direction, of which the upstream side portion is sealed between the bearing housing and the partitioning wall, of which the downstream side portion is sealed between the inner diffuser and the partitioning wall, and in which a strut through-hole through which the strut passes is formed; and a hole seal member which seals a gap between the strut through-hole and the strut.

9 Claims, 7 Drawing Sheets

(56) References Cited

U.S. PATENT DOCUMENTS

2011/0085895 A1    4/2011    Durocher et al.
2013/0223985 A1*  8/2013    Hashimoto .................. 415/111

FOREIGN PATENT DOCUMENTS

JP      2005-069167 A    3/2005
JP      2009-243311 A    10/2009

OTHER PUBLICATIONS

German Office Action dated Sep. 29, 2014, issued in German Patent Application No. 112012005819.4, w/English translation (11 pages).
International Search Report dated Oct. 23, 2012, issued in corresponding application No. PCT/JP2012/071982, with English Translation.
Notice of Allowance dated Jun. 2, 2015, issued in corresponding Korean Patent Application No. 10-2014-7020119 with English translation (3 pages).

* cited by examiner

UPSTREAM SIDE ← → DOWNSTREAM SIDE

GAS TURBINE ENGINE BEARING SUPPORT STRUT

TECHNICAL FIELD

The present invention relates to a gas turbine, and in particular, a seal structure of cooling air around a combustion gas exhaust chamber in the gas turbine.

Priority is claimed based on Japanese Patent Application, First Publication No. 2012-039942 filed Feb. 27, 2012, the content of which is incorporated herein by reference.

BACKGROUND ART

A gas turbine generally includes a compressor which generates compressed air by compressing ambient air, a combustor which generates combustion gas by mixing fuel into the compressed air and burning the mixture gas, and a turbine having a rotor which is rotated by the combustion gas. The combustion gas having rotated the rotor of the turbine is discharged into the atmosphere through an exhaust chamber of the turbine.

In such a gas turbine, with increases in efficiency, the temperature of the combustion gas which is supplied to the turbine is becoming extremely high. For this reason, a lot of components of the turbine have become objects to be cooled, and components constituting the exhaust chamber or components around the exhaust chamber have also become objects to be cooled.

A cooling structure around the exhaust chamber in a gas turbine is disclosed, for example, in Patent Document 1 below. The exhaust chamber is formed with a cylindrical exhaust chamber wall around a rotation axis of a rotor. Cylindrical outer and inner diffusers are arranged on the inside of the exhaust chamber wall in the radial direction around the rotation axis of the rotor. The outer diffuser is provided along the inner periphery of an exhaust chamber wall. The inner diffuser is arranged inside the outer diffuser in the radial direction with a space therebetween. A space between the outer diffuser and the inner diffuser forms a combustion gas exhaust air channel. In addition, a bearing which rotatably supports the rotor, and a bearing housing which covers and supports the bearing are provided on the inside of the inner diffuser in the radial direction. The exhaust chamber wall and the bearing housing are connected to each other by a strut which passes through the outer diffuser and the inner diffuser. The strut extends in the tangential direction of the rotor, and is covered by a strut cover along the extending direction thereof. One end of the strut cover in the extending direction is attached to the outer diffuser, and the other end is attached to the inner diffuser. A partitioning wall having a strut through-hole through which the strut passes is arranged between the inside of the inner diffuser in the radial direction and the outside of the bearing housing in the radial direction.

For example, compressed air which is extracted from the compressor is supplied as cooling air to a space between the inner periphery of the exhaust chamber wall and the outer periphery of the outer diffuser. The cooling air passes through a gap between the strut and the strut cover, flows into between the inner periphery of the inner diffuser and the partitioning wall, and is then discharged into the combustion gas exhaust air channel, for example. During this time, the cooling air cools the outer diffuser, the strut, the strut cover, and the inner diffuser.

The upstream side portion of the partitioning wall and the bearing housing are sealed therebetween so that the partitioning wall is movable relative to the bearing housing in the axial direction and the radial direction. In addition, the downstream side portion of the partitioning wall and the inner diffuser are sealed therebetween so that the partitioning wall is movable relative to the inner diffuser in the axial direction and the radial direction.

A partitioning wall support member which supports the partitioning wall, which is relatively movable with respect to the bearing housing and the inner diffuser in the axial direction and the radial direction, is provided between the partitioning wall and the bearing housing. The partitioning wall support member includes a cylindrical outer support member of which an outer end in the radial direction is fixed along an edge of a strut hole of the partitioning wall, and which covers the strut, and a cylindrical inner support member of which an inner end in the radial direction is fixed to the bearing housing and which covers the strut. The outer support member is movable in the extending direction of the strut relative to the inner support member, and a seal member which seals a gap between the support members is arranged therebetween.

That is, in the gas turbine disclosed in Patent Document 1, cooling air, which flows from the inside of the strut cover to the inside of the inner diffuser in the radial direction, is sealed by the partitioning wall and the partitioning wall support member.

In the gas turbine disclosed in Patent Document 1, when the strut expands in the extending direction thereof due to its thermal expansion, the bearing housing is rotated around the rotation axis of the rotor since the extending direction is the tangential direction of the rotor. In this manner, when the bearing housing is rotated, the relative positions of the inner support member and the outer support member in the extending direction are changed. Therefore, as described above, in the gas turbine, the outer support member is movable in the extending direction relative to the inner support member.

PRIOR ART DOCUMENTS

Patent Document

[Patent Document 1] Japanese Unexamined Patent Application, First Publication No. 2009-243311

SUMMARY OF THE INVENTION

Problem that the Invention is to Solve

In the technology disclosed in the above described Patent Document 1, it is difficult to make the gap width between the outer support member and the inner support member constant since both the outer support member and the inner support member as constituent elements of the partitioning wall support member are cylindrically formed by using a relatively thin plate. Further, in the outer support member and the inner support member which are cylindrically formed by using the relatively thin plate, variation of the gap width therebetween tends to be large due to thermal expansion or thermal contraction in each of them. For this reason, the partitioning wall support member vibrates easily due to backlash.

In addition, in the technology disclosed in the above described Patent Document 1, the gap between the inner support member and the outer support member has to be sealed in a state in which the outer support member is movable relative to the inner support member in the extending direction of the strut, while receiving a part of the weight of the partitioning wall.

For this reason, in the technology disclosed in the above described Patent Document 1, there is a problem in that the outer support member, the inner support member, and the seal member become damaged in a relatively short period due to vibration of the partitioning wall support member, and the sealing property of the cooling air channel is deteriorated.

Therefore, in order to solve the above problem, an object of the present invention is to provide a gas turbine which can maintain the sealing property of the cooling air channel for a long period of time.

Means for Solving the Problems

The gas turbine according to the present invention includes a rotor which rotates around a rotation axis; an exhaust chamber wall which forms a cylindrical shape around the rotation axis; an outer diffuser which forms a cylindrical shape around the rotation axis, and is provided along an inner periphery of the exhaust chamber wall; an inner diffuser which forms a cylindrical shape around the rotation axis, is arranged inside of the outer diffuser in the radial direction, and forms a combustion gas exhaust air channel between the inner diffuser and the outer diffuser; a bearing housing which is arranged inside of the inner diffuser in the radial direction, and covers and supports a bearing which rotatably supports the rotor; a plurality of struts which is arranged with intervals in the circumferential direction with respect to the rotation axis between the exhaust chamber wall and the bearing housing, passes through the outer diffuser and the inner diffuser, and connects the exhaust chamber wall and the bearing housing; a strut cover which is arranged along the extending direction of the strut, has one end thereof in the extending direction attached to the outer diffuser and the other end thereof attached to the inner diffuser, and which covers the strut with a gap therebetween so that cooling air passes between the strut and the strut cover; a partitioning wall which is arranged between the inside of the inner diffuser in the radial direction and the outside of the bearing housing in the radial direction, of which an upstream side portion is sealed between a fixing member which is fixed to the upstream side of the bearing housing and the partitioning wall, of which a downstream side portion is sealed between the inner diffuser and the partitioning wall, and in which a strut through-hole through which the strut passes is formed; and a hole seal member which is fixed to the strut through-hole of the partitioning wall so as to be movable in the extending direction relative to the strut, and seals a gap between the strut through-hole and the strut.

In the gas turbine, cooling air which is supplied to the space between the inside of an exhaust chamber wall in the radial direction and the outside of the outer diffuser in the radial direction passes between the strut cover and the strut, and flows into between the inside of the inner diffuser in the radial direction and the outside of the partitioning wall in the radial direction. Through this process, the cooling air performs heat exchange with and cools the outer diffuser, the strut cover, the strut, and the inner diffuser.

The strut expands or contracts in the extending direction due to its thermal expansion or thermal contraction. The hole seal member seals a gap between the strut through-hole of the partitioning wall and the strut while being allowed to move relative to the strut in the extending direction of it. Accordingly, in the gas turbine, it is possible to seal the gap between the strut through-hole of the partitioning wall and the strut even when the strut expands or contracts in the extending direction thereof.

In addition, in the gas turbine, since it is not necessary for the hole seal member to receive the weight of the partitioning wall, the hole seal member is hardly damaged, and it is possible to seal a cooling air channel for a long period of time.

The gas turbine according to the present invention may include a fixing unit which fixes either the upstream side portion or the downstream side portion of the partitioning wall to a member of a sealing partner, and a partitioning wall end seal member which seals between the member of the sealing partner and the partitioning wall so that the other side portion and the member of the sealing partner are movable relative to each other.

In the gas turbine, any one side portion of the upstream side portion and the downstream side portion of the partitioning wall is fixed to the member of the sealing partner (fixing member which is fixed to the upstream side of the bearing housing, or the inner diffuser) by the fixing unit, and a gap between the one side portion of the partitioning wall and the member of the sealing partner is sealed. Accordingly, the partitioning wall is relatively stably supported by the member of the sealing partner. As a result, in the gas turbine, the position of the hole seal member which is fixed to the partitioning wall is also relatively stable, and it is possible to suppress damage to the hole seal member due to vibration, or the like.

Since the inner diffuser is exposed to combustion gas, while the partitioning wall is not exposed to the combustion gas, a difference in thermal expansion occurs between them due to a difference in temperature between them. As a result, of the upstream side portion and the downstream side portion of the partitioning wall having one side portion fixed to the member of the sealing partner (the fixing member which is fixed to the upstream side of the bearing housing, or the inner diffuser), the other side portion and the member of the sealing partner thereof (the inner diffuser, or the fixing member which is fixed to the upstream side of the bearing housing) are displaced relative to each other in the axial direction and the radial direction. The partitioning wall end seal member seals a gap between the other side portion of the partitioning wall and the member of the sealing partner thereof while allowing a relative displacement between them. Accordingly, in the gas turbine, it is possible to seal the gap between the inner diffuser and the partitioning wall even when a difference in thermal expansion occurs between them.

In the gas turbine according to the present invention, the partitioning wall end seal member may include a seal holding body which is fixed to the other side portion of the partitioning wall, is recessed to a side away from the member of the sealing partner in the other side portion in the radial direction, and is formed with a groove extending in the circumferential direction; a seal body which is arranged in the groove of the seal holding body so as to be movable in the radial direction, and makes surface contact with the member of the sealing partner of the other side portion in a sliding manner in an axial direction in which the rotation axis extends; and an elastic body which is accommodated in the seal holding body, and presses the seal body against the member of the sealing partner of the other side portion.

In the gas turbine, since the member of the sealing partner of the other side portion of the partitioning wall and the seal body make surface contact with each other, it is possible to increase a sealing property between the other side portion of the partitioning wall and the member of the sealing partner thereof, even when they are displaced relative to each other.

In the gas turbine according to the present invention, the hole seal member may include a sliding contact portion which makes sliding contact with the strut when the hole seal member relatively moves with respect to the strut in the extending direction. In this case, the hole seal member may include a circular seal ring in which a minute gap is secured between the strut and the circular seal ring in all the directions perpendicular to the extending direction, and a seal body which is fixed to the inner peripheral side of the seal ring, and as the sliding contact portion makes sliding contact with the strut while being movable relative to the strut in the extending direction.

Since the hole seal member of the gas turbine has the sliding contact portion which makes sliding contact with the strut when the hole seal member relatively moves with respect to the strut in the extending direction, it is possible to increase a sealing property between the strut through-hole of the partitioning wall and the strut. Further, in the gas turbine, since it is possible to suppress vibration of the hole seal member with respect to the strut, it is possible to prevent the hole seal member from being damaged.

Effects

According to the present invention, it is possible to maintain a sealing property of a channel of cooling air which flows between a strut cover and a strut for a long period of time.

BEST MODE FOR CARRYING OUT THE INVENTION

Hereinafter, an embodiment of a gas turbine according to the present invention will be described in detail with reference to FIGS. 1 to 8.

Figure 1:
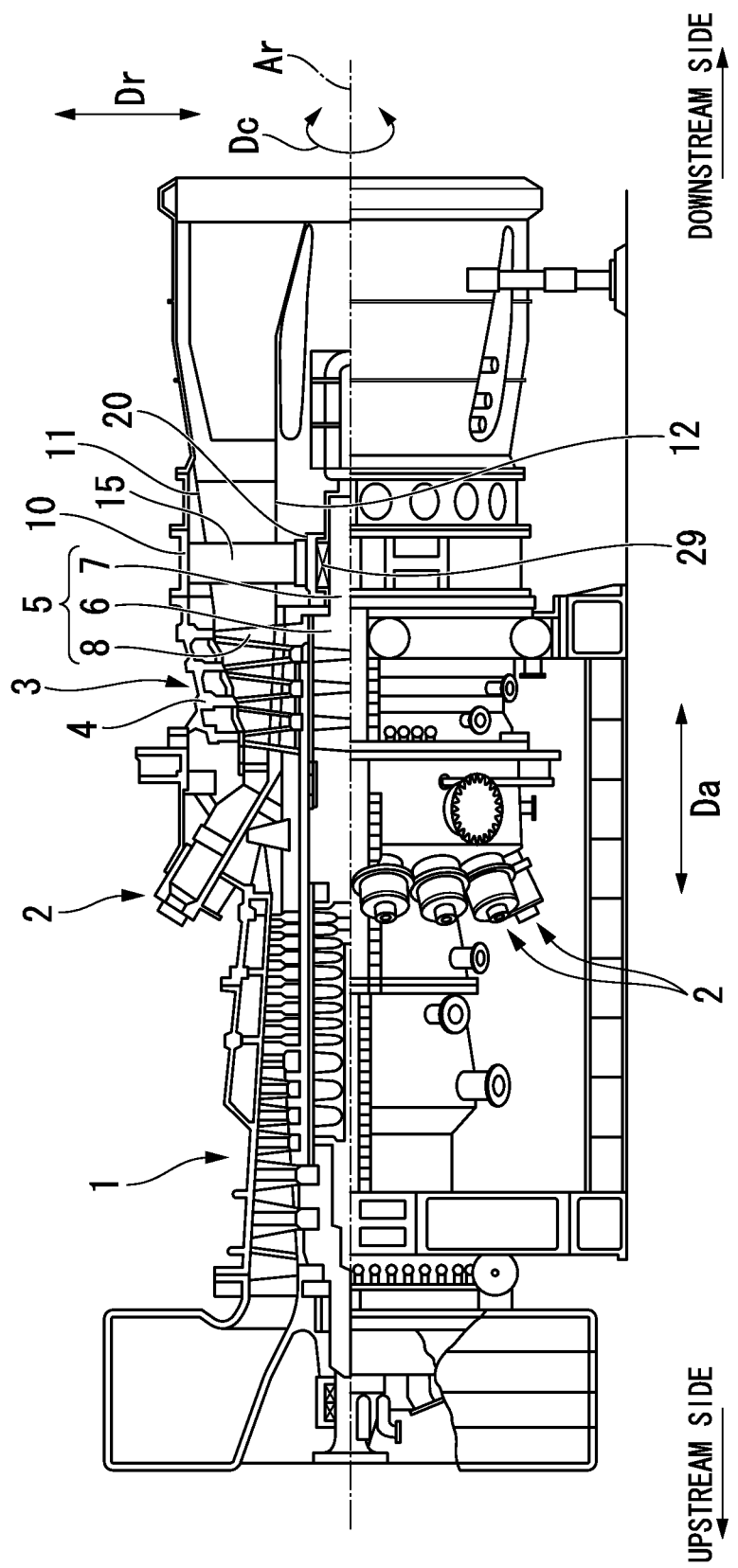
FIG. 1 is a cutaway side view of a main part of a gas turbine according to an embodiment of the present invention.

As shown in FIG. 1, the gas turbine according to the embodiment includes a compressor 1 which generates compressed air by compressing ambient air, a plurality of combustors 2 which generates combustion gas by mixing fuel from a fuel supply source into the compressed air, and burning the mixture gas, and a turbine 3 which is driven by using the combustion gas.

The turbine 3 includes a casing 4, and a turbine rotor 5 which rotates in the casing 4. The turbine rotor 5 is connected to a generator (not shown) which generates power by the rotation of the turbine rotor 5, for example. The plurality of combustors 2 is fixed to the casing 4 in the circumferential direction Dc at regular intervals around a rotation axis Ar of the turbine rotor 5. Hereinafter, the direction in which the rotation axis Ar extends is referred to as the axial direction Da, and the radial direction with respect to the rotation axis Ar is simply referred to as the radial direction Dr. In addition, in the axial direction Da, the compressor 1 side with respect to the turbine 3 is referred to as the upstream side, and the turbine 3 side with respect to the compressor 1 is referred to as the downstream side.

Figure 2:
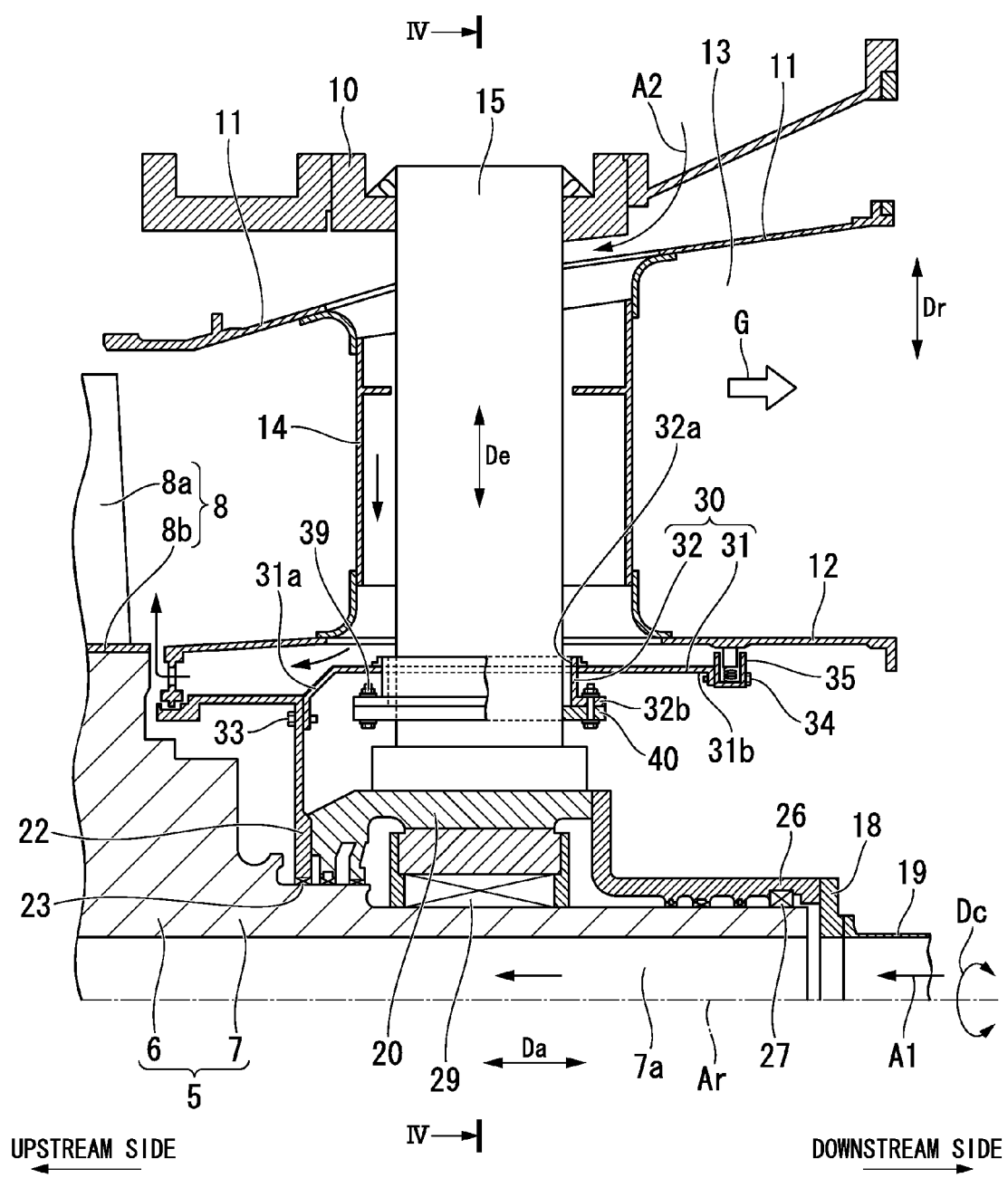
FIG. 2 is a cross-sectional view of the main part of the gas turbine according to the embodiment of the present invention.

The turbine rotor 5 includes, in each of a plurality of stages arranged in the axial direction Da, a rotor disc 6 which is located around the rotation axis Ar, a plurality of blades 8 which is aligned in the circumferential direction Dc, and are fixed to the rotor disc 6, and a shaft 7 which extends in the axial direction Da and is fixed to the rotor disc 6 in the last stage. As shown in FIG. 2, the blades 8 include a blade main body 8a which extends in the radial direction Dr, a platform 8b which is formed at the inner end of the blade main body 8a in the radial direction, and a blade root (not shown) which extends from the platform 8b toward the inside in the radial direction. The blade root of the blade 8 is inserted into the rotor disc 6 and is fixed to the rotor disc 6. The shaft 7 forms a pillar shape around the rotation axis Ar and is provided on the downstream side of the rotor disc 6 in the last stage.

The casing 4 forms a cylindrical shape around the rotation axis Ar and has an exhaust chamber wall 10 which is arranged on the downstream side of the blade 8 in the last stage. An outer diffuser 11 and an inner diffuser 12 which form cylindrical shapes around the rotation axis Ar are arranged inside the exhaust chamber wall 10 in the radial direction. The outer diffuser 11 is provided along the inner periphery of the exhaust chamber wall 10. The inner diffuser 12 is arranged inside the outer diffuser 11 in the radial direction with a space therebetween. An exhaust air channel 13 for a combustion gas G which has rotated the turbine rotor 5 is formed between the outer diffuser 11 and the inner diffuser 12.

A bearing 29 which rotatably supports the shaft 7 of the turbine rotor 5, and a bearing housing 20 which covers the outer peripheral side of the bearing 29 and supports the bearing 29 are provided inside the inner diffuser 12 in the radial direction. An upstream side seal holding ring (fixing member) 22 is fixed to the upstream end of the bearing housing 20, and a downstream side seal holding ring 26 is fixed to the downstream end of the bearing housing 20. A shaft seal 23 which seals a gap between the turbine rotor 5 and the upstream side seal holding ring 22 is provided on the inner peripheral side of the upstream side seal holding ring 22. In addition, a plurality of shaft seals 27 which seals a gap between the turbine rotor 5 and the downstream side seal holding ring 26 is provided on the inner peripheral side of the downstream side seal holding ring 26.

A main cooling air channel 7a which extends in the axial direction Da is formed in the shaft 7 of the turbine rotor 5. The main cooling air channel 7a opens on the downstream end of the turbine rotor 5. A rotor seal flange 18 is arranged on the downstream end of the shaft 7 with a gap therebetween in the axial direction Da. The rotor seal flange 18 is fixed to the downstream side seal holding ring 26 at the outer peripheral side portion thereof. A cooling air supply pipe 19 is fixed to the rotor seal flange 18. The cooling air supply pipe 19 and the main cooling air channel 7a of the shaft 7 communicate with each other.

Figure 4:
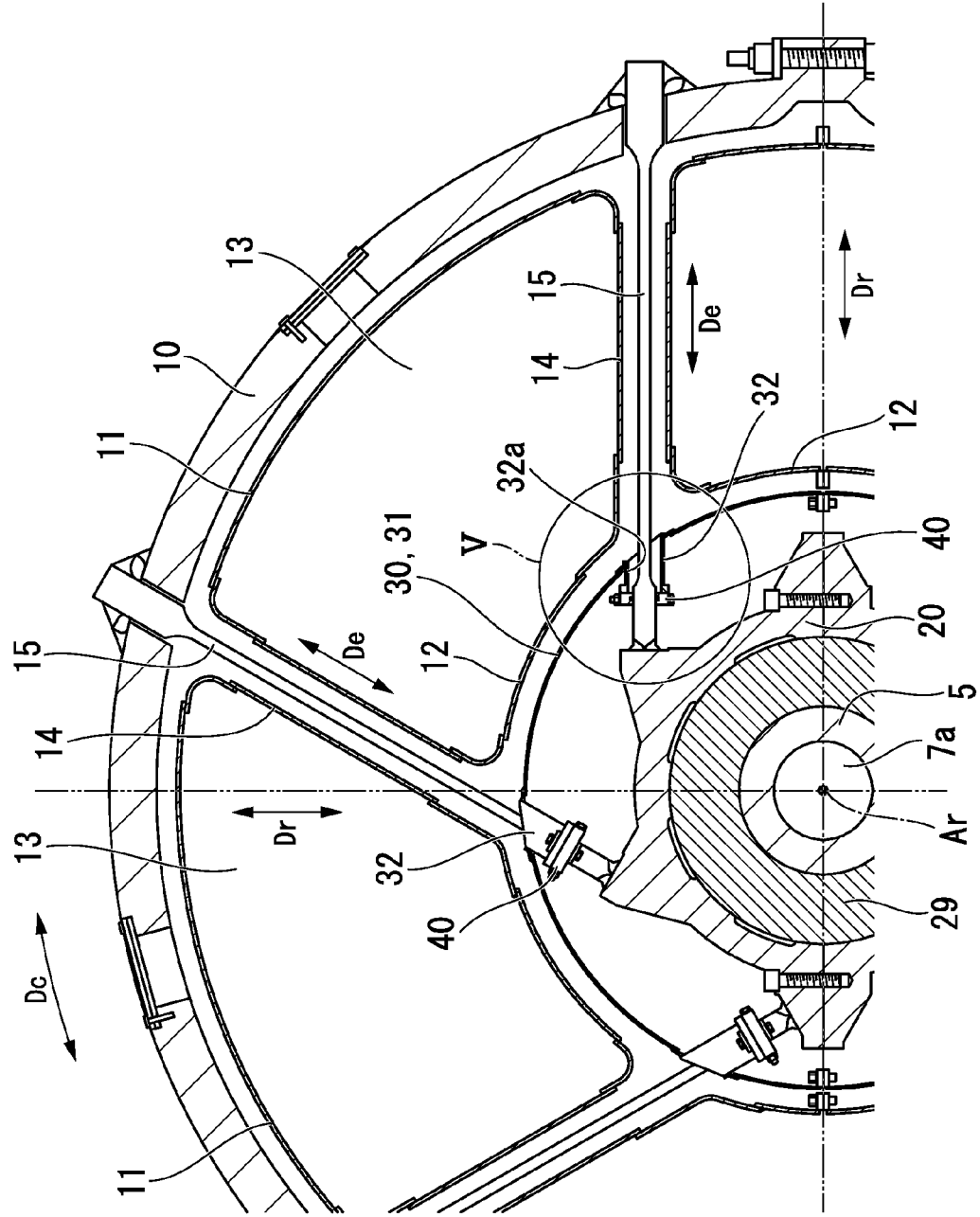
FIG. 4 is a cross-sectional view which is taken along line IV-IV in FIG. 2.

The exhaust chamber wall 10 and the bearing housing 20 are connected to each other by the strut 15 which passes through the outer diffuser 11 and the inner diffuser 12. As shown in FIGS. 2 and 4, the strut 15 extends in the tangential direction of the turbine rotor 5 and is covered with the strut cover 14 along the extending direction De. One end portion of the strut cover 14 in the extending direction De is attached to the outer diffuser 11, and the other end is attached to the inner diffuser 12. A cylindrical partitioning wall 30 is arranged between the inside of the inner diffuser 12 in the radial direction and the outside of the bearing housing 20 in the radial direction around the rotation axis Ar. A strut through-hole 32a through which the strut 15 passes is formed on the partitioning wall 30. In addition, a hole seal member 40 which seals a gap between the strut through-hole 32a and the strut 15 is provided on the partitioning wall 30.

Figure 3:
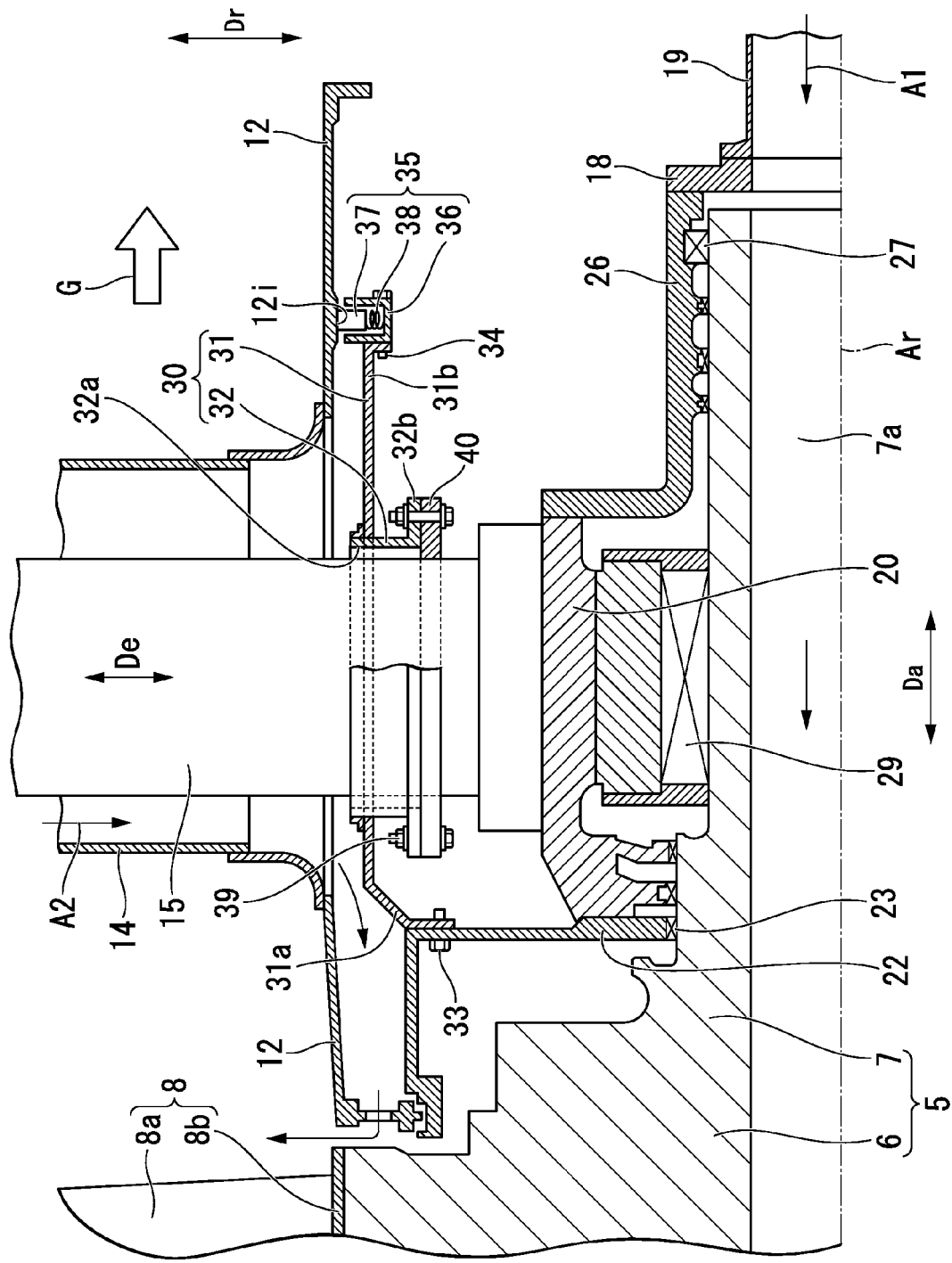
FIG. 3 is an enlarged view around a bearing housing and a hole seal member in FIG. 2.
Figure 5:
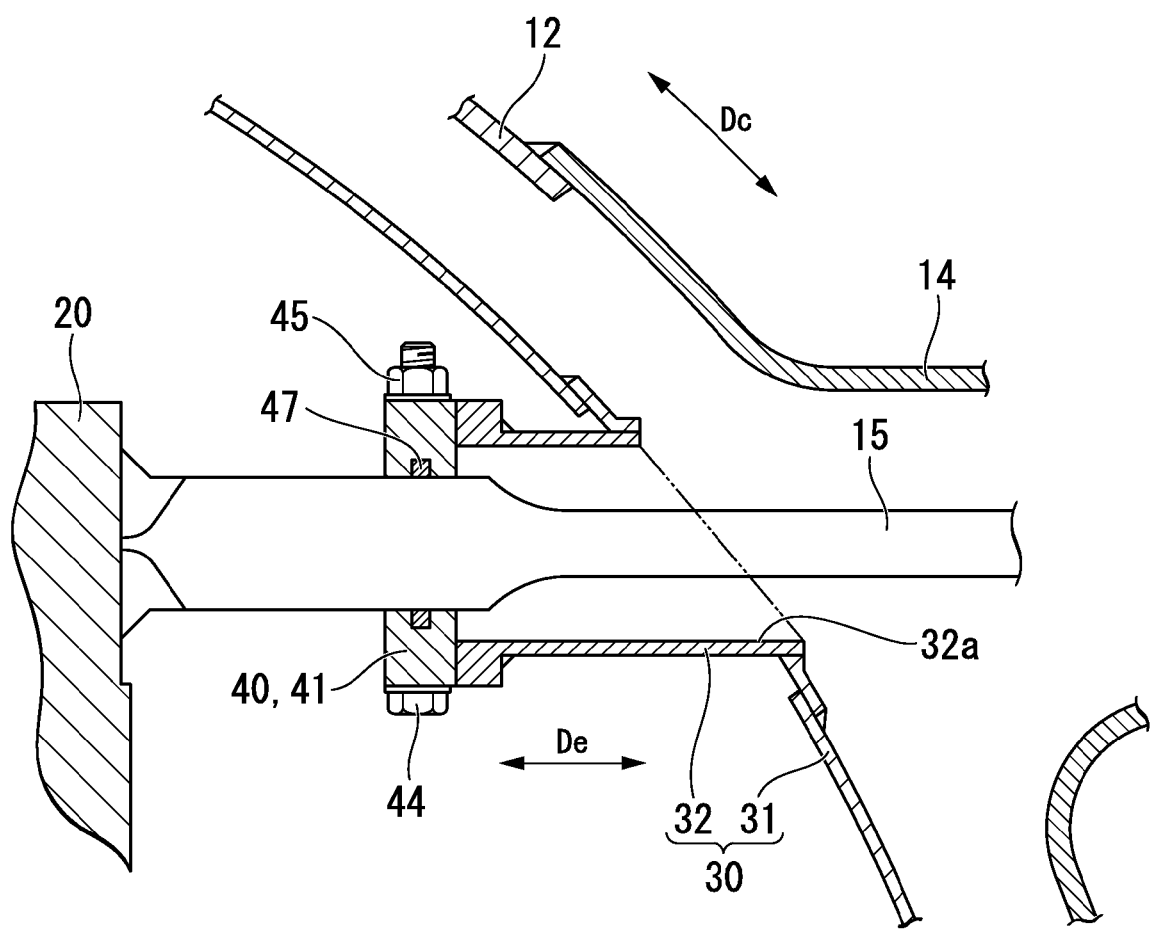
FIG. 5 is an enlarged view of the V portion in FIG. 4.

As shown in FIGS. 3 and 5, the partitioning wall 30 includes a partitioning wall main body 31 which forms a cylindrical shape around the rotation axis Ar, and a cylinder portion 32 which extends in the extending direction De of the strut 15 and covers the strut 15.

An upstream side portion 31a of the partitioning wall main body 31 is fixed to the upstream side seal holding ring 22 by a bolt (fixing unit) 33, and a gap between the upstream side seal holding ring 22 and the upstream side portion 31a is sealed. In addition, a partitioning wall end seal member 35 which seals a gap between a downstream side portion 31b of the partitioning wall 30 and the inner diffuser 12 is provided in the downstream side portion 31b of the partitioning wall 30. An opening through which the strut 15 passes is formed on the partitioning wall main body 31. The cylinder portion 32 is fixed to the partitioning wall main body 31 along an edge of the opening of the partitioning wall main body 31. The inner peripheral side of the cylinder portion 32 forms the above described strut through-hole 32a.

Figure 6:
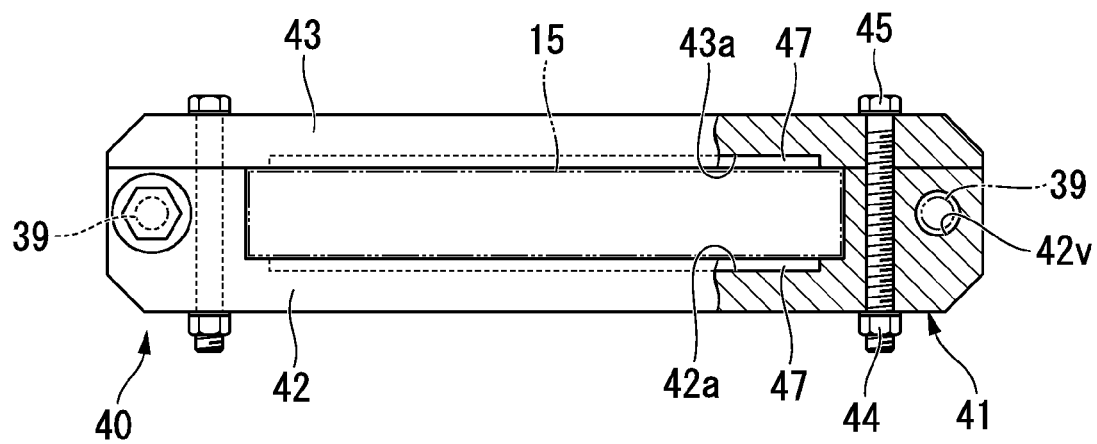
FIG. 6 is a cutaway plan view of a main part of the hole seal member according to the embodiment of the present invention, when seen from the inside in the radial direction.
Figure 7:
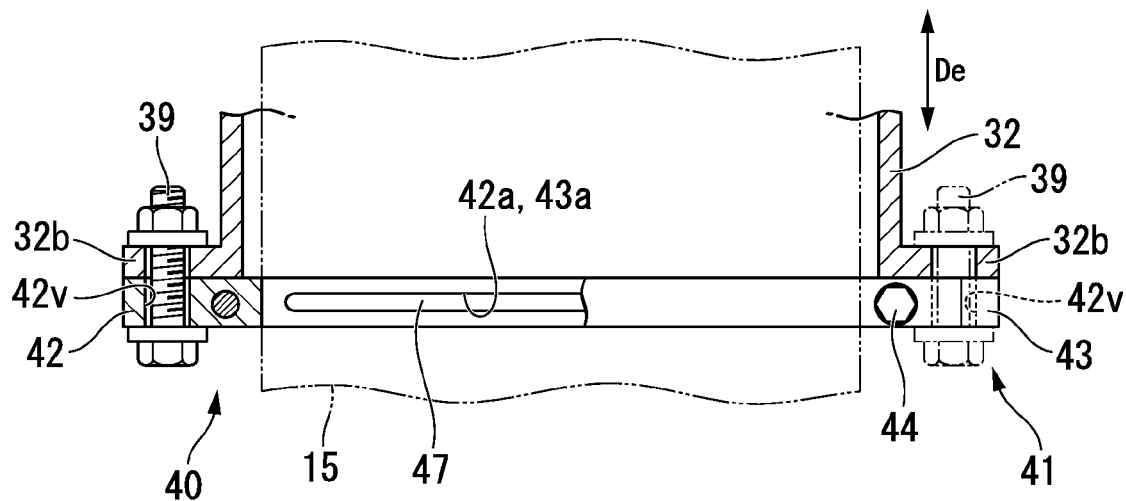
FIG. 7 is a cutaway side view of a main part of the hole seal member according to the embodiment of the present invention.

A flange unit 32b which extends from the inside to the outside of the cylinder portion 32 is formed at the inner end of the cylinder portion 32 in the radial direction. The above described hole seal member 40 is fixed to the flange unit 32b by using a bolt 39 and a nut. As shown in FIGS. 6 and 7, the hole seal member 40 includes a circular seal ring 41 in which a minute gap is secured between the strut 15 and the circular seal ring 41 in all the directions perpendicular to the extending direction De of the strut 15, and a seal body 47 which is fixed to the inner peripheral side of the seal ring 41, and make sliding contact with the strut 15 while being movable relative to the strut 15 in the extending direction De thereof.

The circular seal ring 41 includes a first seal ring piece 42 which forms a part of the circular shape, a second seal ring piece 43 which forms the remaining portion of the circular shape, and a bolt 44 and a nut 45 which connect the first seal ring piece 42 to the second seal ring piece 43. Here, the first seal ring piece 42 and the second seal ring piece 43 basically do not come into contact with the strut 15. However, they are formed with aluminum alloy which is a relatively soft metal, in order to prevent the strut 15 from wearing or the like when coming into contact with the seal ring pieces due to aging or the like. Sealing grooves 42a and 43a which are recessed to the outside from the inside are respectively formed on the first seal ring piece 42 and the second seal ring piece 43. The seal body 47 is fixed by being fitted to the seal grooves 42a and 43a of the respective seal ring pieces 42 and 43. The seal body 47 is, for example, a graphite packing.

Bolt holes 42v are formed at two positions in the first seal ring piece 42 which are symmetric about a position in which the strut 15 is accommodated so as to pass through the first seal ring piece 42 in the extending direction De of the strut 15. A shaft portion of the bolt 39 which fixes the seal ring 41 to the cylinder portion 32 of the partitioning wall 30 is inserted through a metal washer into the bolt hole 42v. The inner diameter of the bolt hole 42v is larger than the outer diameter of the shaft portion of the bolt 39 which is inserted thereinto. That is, the bolt hole 42v is a so-called clearance hole with respect to the shaft portion of the bolt 39 which is inserted thereinto. For this reason, the bolt 39 is movable to some extent relative to the first seal ring piece 42 in the direction perpendicular to the extending direction De in a state in which the shaft portion of the bolt 39 is inserted into the bolt hole 42v. Accordingly, the first seal ring piece 42 which is connected to the cylinder portion 32 of the partitioning wall 30 by the bolt 39 is movable to some extent relative to the cylinder portion 32 in the direction perpendicular to the extending direction De.

The partitioning wall 30 is a welded structure of a metal plate in which both the partitioning wall main body 31 and the cylinder portion 32 are formed by using relatively thin plates. For this reason, it is difficult to accurately arrange the seal ring 41, which is fixed to the partitioning wall 30, with respect to the strut 15. Here, as described above, the relative position of the seal ring 41 with respect to the strut 15 is made adjustable by configuring the bolt hole 42v for the bolt 39 which connects the partitioning wall 30 to the seal ring 41 to be the clearance hole, and by allowing relative movement of the seal ring 41 with respect to the cylinder portion 32 of the partitioning wall 30 in the direction perpendicular to the extending direction De.

Figure 8:
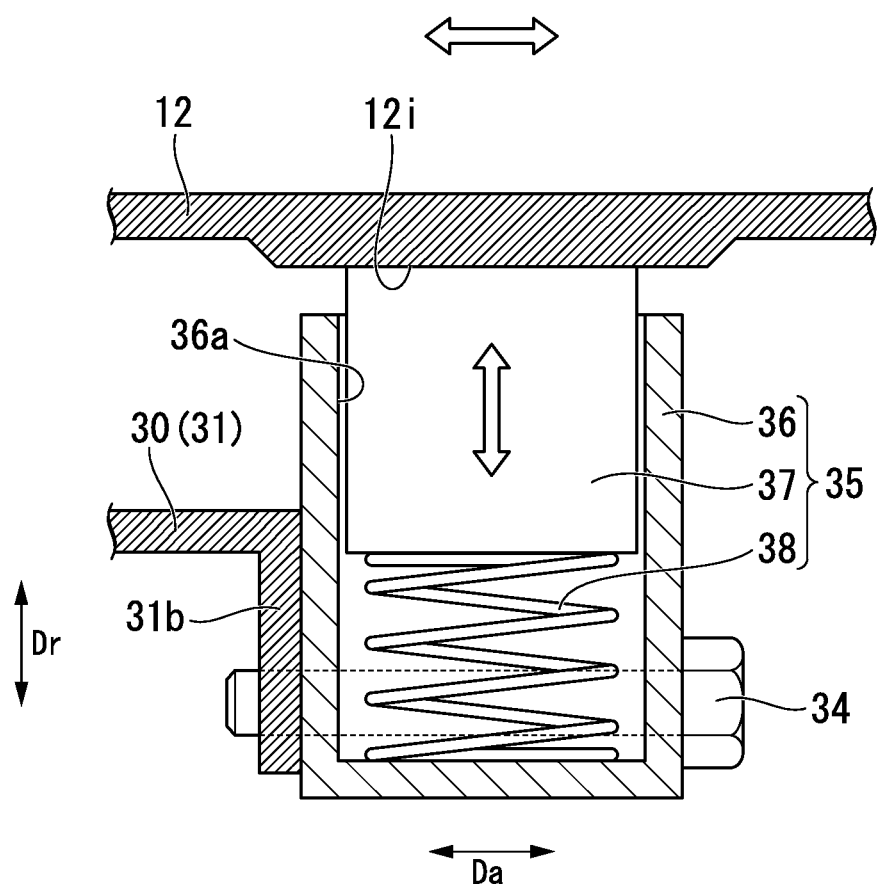
FIG. 8 is a cross-sectional view of a partitioning wall end seal member according to the embodiment of the present invention.

As shown in FIG. 8, the partitioning wall end seal member 35 which seals the gap between the downstream side portion 31b of the partitioning wall 30 and the inner diffuser 12 includes a seal holding body 36 having a groove 36a which is recessed from the outside in the radial direction to the inside in the radial direction and extends in the circumferential direction Dc, a seal body 37 which is arranged in the groove 36a so as to be movable in the radial direction Dr and makes surface contact with the inner periphery 12i of the inner diffuser 12 in a sliding manner, and a spring 38 as an elastic body which presses the seal body 37 against the inner diffuser 12. The seal holding body 36 is fixed to the downstream side portion 31b of the partitioning wall 30 by using a bolt 34. The seal body 37 forms a ring shape, and the outer diameter thereof is slightly smaller than the inner diameter of the cylindrical inner diffuser 12. The seal body 37 is configured by a plurality of seal pieces each forming a part of the seal body 37 in the circumferential direction Dc. The plurality of seal pieces is arranged in the groove 36a of the seal holding body 36 so as to be movable in the radial direction Dr. Adjacent seal pieces in the circumferential direction partially overlap each other in the circumferential direction Dc.

Next, a flow of the cooling air in the above described gas turbine will be described with reference to FIG. 2.

For example, compressed air of approximately 200 C which is extracted from the compressor 1 is supplied as cooling air A1 to the cooling air supply pipe 19 which is arranged on the downstream side of the turbine rotor 5. The cooling air A1 flows into the main cooling air channel 7a of the rotating turbine rotor 5 and cools the blade 8 and the like.

In addition, for example, compressed air of approximately 200 C which is extracted from the compressor 1 is also supplied as cooling air A2 to the space between the inner periphery of the exhaust chamber wall 10 and the outer periphery of the outer diffuser 11. The cooling air A2 passes through a space between the strut 15 and the strut cover 14, and flows into between the inner periphery of the inner diffuser 12 and the partitioning wall 30. Then, the cooling air A2 passes between the inner diffuser 12 and the upstream side seal holding ring 22 and flows into the exhaust air channel 13 between the inner diffuser 12 and the outer diffuser 11 from between the downstream end of the platform 8b of the blade 8 in the last stage and the upstream end of the inner diffuser 12.

The cooling air A2 cools the outer diffuser 11, the strut 15, the strut cover 14, and the inner diffuser 12 while flowing into the exhaust air channel 13 from between the inner periphery of the exhaust chamber wall 10 and the outer periphery of the outer diffuser 11.

The cooling air A2 of approximately 200 C is gradually warmed while cooling the outer diffuser 11, the strut 15, and the strut cover 14. The partitioning wall 30 is provided so as to prevent the bearing 29 from being heated when the warmed cooling air A2 comes into contact with the bearing housing 20.

The strut 15 expands or contracts in the extending direction De due to the thermal expansion or the thermal contraction. According to the embodiment, as described above with reference to FIG. 4, since the extending direction De of the strut 15 is the tangential direction of the turbine rotor 5, the bearing housing 20 which is fixed to the end portion of the strut 15 rotates around the rotation axis Ar, and hardly moves in the axial direction Da or the radial direction Dr even when the strut 15 expands or contracts. For this reason, according to the embodiment, it is possible to stably support the turbine rotor 5 so as to be rotatable around the rotation axis Ar even when the strut 15 expands or contracts.

The hole seal member 40 seals the gap between the strut through-hole 32a of the partitioning wall 30 and the strut 15. In the seal ring 41 of the hole seal member 40, a minute gap is secured between the strut 15 and the seal ring in all the directions perpendicular to the extending direction De of the strut 15. For this reason, the circular seal ring 41 is able to seal the gap between the strut through-hole 32a of the partitioning wall 30 and the strut 15 while being allowed to move relative to the strut 15 in the extending direction De. In addition, the seal body 47 is partially provided on the inner peripheral side of the circular seal ring 41. Since the seal body 47 makes sliding contact with the strut 15 when moving in the extending direction De with respect to the strut 15, it is possible to increase the sealing property between the strut through-hole 32a of the partitioning wall 30 and the strut 15.

The upstream side portion 31a of the partitioning wall 30 is fixed to the upstream side seal holding ring 22 by using a bolt 33. For this reason, the gap between the upstream side portion 31a of the partitioning wall 30 and the upstream side seal holding ring 22 is sealed. In addition, the partitioning wall end seal member 35 is provided on the downstream side portion 31b of the partitioning wall 30, and the gap between the downstream side portion 31b of the partitioning wall 30 and the inner diffuser 12 is sealed.

Since the inner diffuser 12 is exposed to the combustion gas G, while the partitioning wall 30 is not exposed to the combustion gas G, the difference in thermal expansion occurs between them due to the difference in temperature between them. As a result, the downstream side portion 31b of the partitioning wall 30, of which the upstream side portion 31a is fixed to the upstream side seal holding ring 22, and the inner diffuser 12 are displaced relative to each other in the axial direction Da and the radial direction Dr. According to the embodiment, the seal body 37 of the partitioning wall end seal member 35 is provided in the seal holding body 36 so as to be movable in the radial direction Dr, and is pressed against the inner diffuser 12 by the spring 38 so as to make surface contact with the inner periphery 12i of the inner diffuser 12 in a sliding manner. For this reason, according to the embodiment, it is possible to seal the gap between the downstream side portion 31b of the partitioning wall 30 and the inner diffuser 12 while allowing them to be displaced relative to each other in the axial direction Da and the radial direction Dr.

Now, the hole seal member 40 is held by the partitioning wall 30 which is fixed to the upstream side seal holding ring 22 which is integrated with the bearing housing 20. For this reason, as described above, even when the strut 15 expands or contracts in the extending direction De thereof due to the thermal expansion or the thermal contraction, the bearing housing 20 rotates around the rotation axis Ar, or the inner end portion of the strut 15 in the radial direction moves in the circumferential direction Dc, the hole seal member 40 moves in the circumferential direction Dc following the rotation of the bearing housing 20 and is not relatively displaced in the circumferential direction Dc with respect to the inner end portion of the strut 15 in the radial direction. In addition, since the hole seal member 40 is held by the bearing housing 20 through the upstream side seal holding ring 22 and the partitioning wall 30 which are relatively rigid, the hole seal member does not receive the own weight of the partitioning wall as in the structure shown in Patent Document 1. Therefore, according to the embodiment, the hole seal member 40 is hardly damaged, and it is possible to seal the channel for the cooling air A2 for a long period of time.

In addition, according to the embodiment, the partitioning wall 30 and the hole seal member 40 which come into contact with the cooling air A2 which is gradually warmed while cooling the outer diffuser 11, the strut 15, and the strut cover 14 are not in contact with the bearing housing 20. For this reason, according to the embodiment, it is possible to suppress heating of the bearing housing 20 by the warmed cooling air A2 to the minimum, and as a result, it is possible to suppress a temperature rise of the bearing 29.

In addition, according to the embodiment, the upstream side portion 31a of the partitioning wall 30 is fixed to the upstream side seal holding ring 22. However, the downstream side portion 31b of the partitioning wall 30 may be fixed to the inner diffuser 12. In this case, it is preferable to provide a seal member which seals the gap between the upstream side portion 31a of the partitioning wall 30 and the upstream side seal holding ring 22 while allowing the upstream side portion 31a of the partitioning wall 30 and the upstream side sealing holding ring 22 to be displaced relative to each other in the axial direction Da and the radial direction Dr.

In addition, the partitioning wall 30 according to the embodiment includes the partitioning wall main body 31 and the cylinder portion 32 which is fixed to the opening of the partitioning wall main body 31, and the hole seal member 40 is provided in the cylinder portion 32. However, the cylinder portion 32 may be omitted and the hole seal member 40 may be provided in the opening of the partitioning wall main body 31 serving as the through-hole.

In addition, the hole seal member 40 according to the embodiment includes the seal ring 41 and the seal body 47 which is partially arranged on the inner peripheral side of the seal ring 41, but the seal body 47 may be omitted. However, in this case, the amount of leakage of the cooling air A2 increases to some extent. On the other hand, the seal body 47 may be provided on the entire inner peripheral side of the seal ring 41 in order to further reduce the amount of leakage of the cooling air A2.

DESCRIPTION OF THE REFERENCE SYMBOLS

1: COMPRESSOR
2: COMBUSTOR
3: TURBINE
4: CASING
5: TURBINE ROTOR
6: ROTOR DISC
7: SHAFT
7a: MAIN COOLING AIR CHANNEL
8: BLADE
10: EXHAUST CHAMBER WALL
11: OUTER DIFFUSER
12: INNER DIFFUSER

14: STRUT COVER
15: STRUT
20: BEARING HOUSING
22: UPSTREAM SIDE SEAL HOLDING RING (FIXING MEMBER)
29: BEARING
30: PARTITIONING WALL
31a: UPSTREAM SIDE PORTION
31b: DOWNSTREAM SIDE PORTION
32a: STRUT THROUGH-HOLE
33: BOLT (FIXING UNIT)
35: PARTITIONING WALL END SEAL MEMBER
36: SEAL HOLDING BODY
36a: GROOVE
37: SEAL BODY
38: SPRING (ELASTIC BODY)
40: HOLE SEAL MEMBER
41: SEAL RING
47: SEAL BODY

The invention claimed is:

1. A gas turbine comprising:
a rotor which rotates around a rotation axis;
an exhaust chamber wall which forms a cylindrical shape around the rotation axis;
an outer diffuser which forms a cylindrical shape around the rotation axis and is provided along an inner periphery of the exhaust chamber wall;
an inner diffuser which forms a cylindrical shape around the rotation axis, is arranged in an inside of the outer diffuser in a radial direction, and forms a combustion gas exhaust air channel between the inner diffuser and the outer diffuser;
a bearing housing which is arranged in an inside of the inner diffuser in the radial direction and covers and supports a bearing which rotatably supports the rotor;
a plurality of struts which is arranged with intervals in a circumferential direction with respect to the rotation axis between the exhaust chamber wall and the bearing housing, passes through the outer diffuser and the inner diffuser, and connects the exhaust chamber wall and the bearing housing;
a strut cover which is arranged along the extending direction of the strut, of which one end in the extending direction is attached to the outer diffuser and the other end is attached to the inner diffuser, and which covers the strut with a space so that cooling air passes between the strut and the strut cover;
a partitioning wall which is arranged between the inside of the inner diffuser in the radial direction and the outside of the bearing housing in the radial direction, of which an upstream side portion is sealed between a fixing member which is fixed to the upstream side of the bearing housing and the partitioning wall, of which a downstream side is sealed between the inner diffuser and the partitioning wall, and in which a strut through-hole through which the strut passes is formed; and
a hole seal member which is fixed to the strut through-hole of the partitioning wall so as to be relatively movable in the extending direction with respect to the strut, and seals a gap between the strut through-hole and the strut.

2. The gas turbine according to claim 1, further comprising:
a fixing unit which fixes any one side portion of the upstream side portion and the downstream side portion of the partitioning wall to a member of a sealing partner; and
a partitioning wall end seal member which seals between the member of the sealing partner and the partitioning wall so that the other side portion and the member of the sealing partner are movable relative to each other.

3. The gas turbine according to claim 2,
wherein the partitioning wall end seal member includes,
a seal holding body which is fixed to the other side portion of the partitioning wall, is recessed to a side away from the member of the sealing partner of the other side portion in the radial direction, and is formed with a groove extending in the circumferential direction;
a seal body which is arranged in the groove of the seal holding body so as to be movable in the radial direction and makes surface contact in a sliding manner with the member of the sealing partner of the other side portion in an axial direction in which the rotation axis extends; and
an elastic body which is accommodated in the seal holding body, and presses the seal body against the member of the sealing partner of the other side portion.

4. The gas turbine according to claim 3,
wherein the hole seal member includes a sliding contact portion which makes sliding contact with the strut when the hole seal member relatively moves with respect to the strut in the extending direction.

5. The gas turbine according to claim 4,
wherein the hole seal member includes a circular seal ring in which a gap is secured between the strut and the circular seal ring in all the directions perpendicular to the extending direction, and a seal body which is fixed to the inner peripheral side of the seal ring, and as the sliding contact portion makes sliding contact with the strut while being movable relative to the strut in the extending direction.

6. The gas turbine according to claim 2,
wherein the hole seal member includes a sliding contact portion which makes sliding contact with the strut when the hole seal member relatively moves with respect to the strut in the extending direction.

7. The gas turbine according to claim 6,
wherein the hole seal member includes a circular seal ring in which a gap is secured between the strut and the circular seal ring in all the directions perpendicular to the extending direction, and a seal body which is fixed to the inner peripheral side of the seal ring, and as the sliding contact portion makes sliding contact with the strut while being movable relative to the strut in the extending direction.

8. The gas turbine according to claim 1,
wherein the hole seal member includes a sliding contact portion which makes sliding contact with the strut when the hole seal member relatively moves with respect to the strut in the extending direction.

9. The gas turbine according to claim 8,
wherein the hole seal member includes a circular seal ring in which a gap is secured between the strut and the circular seal ring in all the directions perpendicular to the extending direction, and a seal body which is fixed to the inner peripheral side of the seal ring, and as the sliding contact portion makes sliding contact with the strut while being movable relative to the strut in the extending direction.

* * * * *